US007693855B2

(12) United States Patent　　(10) Patent No.: US 7,693,855 B2
Birsa et al.　　(45) Date of Patent: Apr. 6, 2010

(54) METHOD, SYSTEM, AND COMPUTER PROGRAM PRODUCT FOR MANAGING DATA ASSOCIATED WITH A DOCUMENT STORED IN AN ELECTRONIC FORM

(75) Inventors: Brent Birsa, Glenwood, MD (US); Pierre Duchene, Silver Spring, MD (US); Vojin Dvorak, Bethesda, MD (US)

(73) Assignee: Media Cybernetics, Inc., Silver Spring, MD (US)

( * ) Notice: Subject to any disclaimer, the term of this patent is extended or adjusted under 35 U.S.C. 154(b) by 681 days.

(21) Appl. No.: 10/975,033

(22) Filed: Oct. 28, 2004

(65) Prior Publication Data

US 2005/0172212 A1　　Aug. 4, 2005

Related U.S. Application Data

(60) Provisional application No. 60/514,601, filed on Oct. 28, 2003.

(51) Int. Cl.
　　G06F 7/00　　(2006.01)
　　G06F 17/00　　(2006.01)
(52) U.S. Cl. .................... 707/101; 707/104.1; 715/200
(58) Field of Classification Search ................ 707/1–10, 707/100–104.1, 200–206; 715/762–765, 715/200–204
See application file for complete search history.

(56) References Cited

U.S. PATENT DOCUMENTS

| 2,612,994 | A | 10/1952 | Woodland et al. |
| 5,422,674 | A | 6/1995 | Hooper et al. |
| 5,493,638 | A | 2/1996 | Hooper et al. |
| 5,588,149 | A | 12/1996 | Hirose |
| 5,644,765 | A | 7/1997 | Shimura et al. |
| 5,710,899 | A | 1/1998 | Eick |
| 5,911,139 | A | 6/1999 | Jain et al. |
| 5,956,422 | A * | 9/1999 | Alam .................. 382/181 |

(Continued)

OTHER PUBLICATIONS

Bainbridge et al., Assembling and enriching digital library collections, May 27-31, 2003, IEEE, 323-334.*

(Continued)

*Primary Examiner*—Jean B Fleurantin
(74) *Attorney, Agent, or Firm*—Caesar, Rivise, Bernstein, Cohen & Pokotilow, Ltd.

(57) ABSTRACT

A method, system, and computer program product for managing data associated with a document stored in an electronic form. The document can be a part of a file. Computer processed algorithms, user-operated computer graphics tools, or both can be used to derive data from or assign data to the document or the file. First data is derived from the document, second data is assigned to the document, or both. The first data, the second data, or both are organized as attributes of an object of a first computer database. At least one attribute is organized as a child object of the object. The at least one attribute is associated with a feature of the document. Optionally, an attribute is moved from the object of the first computer database to an object of a second computer database and an address of a location in a memory at which the object of the second computer database is stored is added as a new attribute of the object of the first computer database.

20 Claims, 11 Drawing Sheets

U.S. PATENT DOCUMENTS

| | | | |
|---|---|---|---|
| 6,345,274 | B1 | 2/2002 | Zhu et al. |
| 6,568,596 | B1* | 5/2003 | Shaw ..................... 235/462.01 |
| 6,615,141 | B1 | 9/2003 | Sabry et al. |
| 6,629,104 | B1 | 9/2003 | Parulski et al. |
| 6,631,331 | B1 | 10/2003 | Sabry et al. |
| 6,892,255 | B2* | 5/2005 | Teshima ....................... 710/74 |
| 6,925,597 | B2* | 8/2005 | Anwar ......................... 715/209 |
| 2002/1006475 | * | 5/2002 | Durbin et al. ............... 433/213 |
| 2002/0069218 | A1* | 6/2002 | Sull et al. ................. 707/501.1 |
| 2002/0080387 | A1* | 6/2002 | Grasso et al. ............. 358/1.15 |
| 2002/0122606 | A1* | 9/2002 | Knowles ..................... 382/305 |

OTHER PUBLICATIONS

Christodoulakis et al., A Multimedia Document Server, Nov. 1986, IEEE, vol. 1, 2-9.*

Lombardi, Victor "NBS Metadata Glossary" [online], 9 pages, Retrieved from http://www.noisebetweenstations.com/personal/essays/metadata_glossary May 2003 [Retrieved on Oct. 13, 2004].

"dret's XML and Web Service Glossary: Meta Data" [online] p. 1, Retrieved from http://dret.net/glossary/metadata [Retrieved on Oct. 13, 2004].

"Glossary: metadata" [online], 1 page, Retrieved from http://www.-106.ibm.com/developerworks/patterns/glossary/metadata.html [Retrieved on Oct. 13, 2004].

MediaCybernetics, "IQBase: Revolutionary Intelligence for Image Informatics", 6 pages, 2003, Silver Spring, MD.

Fast Objects, Bartels, Dick, et al. "A Comparison Between Relational and Object-Oriented Database Systems for Object-Oriented Application Development" pp. 1-13, 2001.

Fast Objects, Schwieger, Michael. "Getting Started with FastObjects by Poet- A Step by Step JDO Tutorial" pp. 1-19, Sep. 5, 2003.

"Object Oriented Database Systems" [online], 1 page, Retrieved from http://fria.utc.sk/~kmat/dbs/oodbs/OODBS.htm [Retrieved on Oct. 21, 2003].

"What is Inheritance" [online], 2 pages, Retrieved from http://fria.utc.sk/~kmat/dbs/oodbs/inheritance.htm [Retrieved on Oct. 21, 2003].

"What are Messages" [online], 2 pages, Retrieved from http://fria.utc.sk/~kmat/dbs/oodbs/messages.htm [Retrieved on Oct. 21, 2003].

"What are Classes" [online], 3 pages, Retrieved from http://fria.utc.sk/~kmat/dbs/oodbs/class.htm [Retrieved on Oct. 21, 2003].

"Object-Oriented Data Model" [online], 2 pages, Retrieved from http://fria.utc.sk/~kmat/dbs/oodbs/OODBS1b.htm [Retrieved on Oct. 21, 2003].

"Evolution of the Database Technology" [online], 3 pages, Retrieved from http://fria.utc.sk/~kmat/dbs/oodbs/OODBS_1a.htm [Retrieved on Oct. 21, 2003].

"IQbase—Features" [online], 4 pages, Retrieved from http://www.mediacy.com/iqbase/iqbasefeatures.htm [Retrieved on Oct. 20, 2003].

"IQbase image database- archive, manage, and extract knowledge from images", [online], 2 pages, Retrieved from http://www.mediacy.com/iqbase/iqbase.htm [Retrieved on Oct. 20, 2003].

"Graphical User Interface Timeline" [online] 21 pages, Retrieved from http://toastytech.com/guis/guitimeline2.html [Retrieved on Oct. 16, 2003].

"Database Terminology" [online], 4 pages, Retrieved from http://soba.fortlewis/edu/lsc/csis350-f01/terminology.html [Retrieved on Oct. 22, 2003].

"IQbase- Features | Screenshots: Intelligent Archiving" [online] 3 pages, Retrieved from http://mediacy.com/iqbase/iqbasefeatures.htm [Retrieved on Oct. 18, 2004].

"IQ Studio Features" [online] 2 pages, Retrieved from http://mediacy.com/iqs/iqsfeatures.htm [Retrieved on Oct. 18, 2004].

"IQ Imaging Development Forum" [online] 2 pages, Retrieved from http://mediacy.com/forum_intro.htm [Retrieved on Oct. 18, 2004].

"Media Cybernetics | Image Informatics | Image Analysts | From Images to Answers" [online] 1 page, Retrieved from http://mediacy.com/ [Retrieved on Oct. 18, 2004].

"Image Informatics | Image Database | IQbase" [online], 2 pages, Retrieved from http://mediacy.com/iqbase/iqbase.htm [Retrieved on Oct. 18, 2004].

"Document- a Whatis.com definition" [online] 3 pages, Retrieved from http://whatis.techtarget.com/definition/0,,sid9_gci211982,00.html [Retrieved on Oct. 24, 2004].

"File- a Whatis.com definition" [online] 3 pages, Retrieved from http://searchexchange.techtarget.com/sDefinition/0,,sid43_gci212118,00.html [Retrieved on Oct. 24, 2004].

"Image Pro Plus" [online] 6 pages, Retrieved from http://mediacy.com/ipp/ippfeatures.htm [Retrieved on Oct. 18, 2004].

National Library of Australia, Cathro, Dr. Warwick, "Metadata: an Overview" [online] pp. 1-9, Retrieved from http://www.nla.gov.au/nla/staffpaper/cathro3.html [Retrieved on Oct. 24, 2004].

NOAA Coastal Services Center, "What is Metadata" [online], 1 page, Retrieved from http://www.cdc.noaa.gov/metadata/ [Retrieved on Oct. 24, 2004].

"Metadata: Definition" [online] 1 page, Retrieved from http://www.w3.org/People/EM/talks/www7/tutorial/part2/tsld003.htm [Retrieved on Oct. 24, 2004].

"Metadata Education: What is metadata?" [online] 4 pages, Retrieved from http://www.sdvc.uwyo.edu/metadata/what.html [Retrieved on Oct. 24, 2004].

"Glossary: FGDC metadata content Standard" [online] 6 pages, Retrieved from http://geology.usgs.gov/tools/metadata/standard/glossary.html [Retrieved on Oct. 13, 2004].

Wason, Thomas D., "Glossary for Metadata, Taxonomies, & Digital Libraries" [online] 7 pages, Retrieved from http://wason.home.mindspring.com/TDW/Glossary.htm [Retrieved on Oct. 13, 2004].

"Google Search: define: Thumbnail" [online] 3 pages, Retrieved from http://www.google.com/search?hl=en&lr=&oi=defmore&q=define:Thumbnail [Retrieved on Oct. 13, 2004].

"FastObjects, Inc.—High Performance Made Simple—Provider of JDO databases, Java databases and C++ databases." [online] 1 page, Retrieved from http://www.fastobjects.com/us/ [Retrieved on Oct. 20, 2003].

"FastObjects, Inc.—Developer Infortmation—White Papers" [online] 2 pages, Retrieved from http://www.fastobjects.com/us/FastObjects_DeveloperInfo_WhitePapers.asp [Retrieved on Oct. 20, 2003].

"McDBLib—Database Engine" [online] 6 pages, Retrieved from http://www.mediacy.com/iqs/documentx/McDBLib%20Overview.htm [Retrieved on Jan. 16, 2008].

* cited by examiner

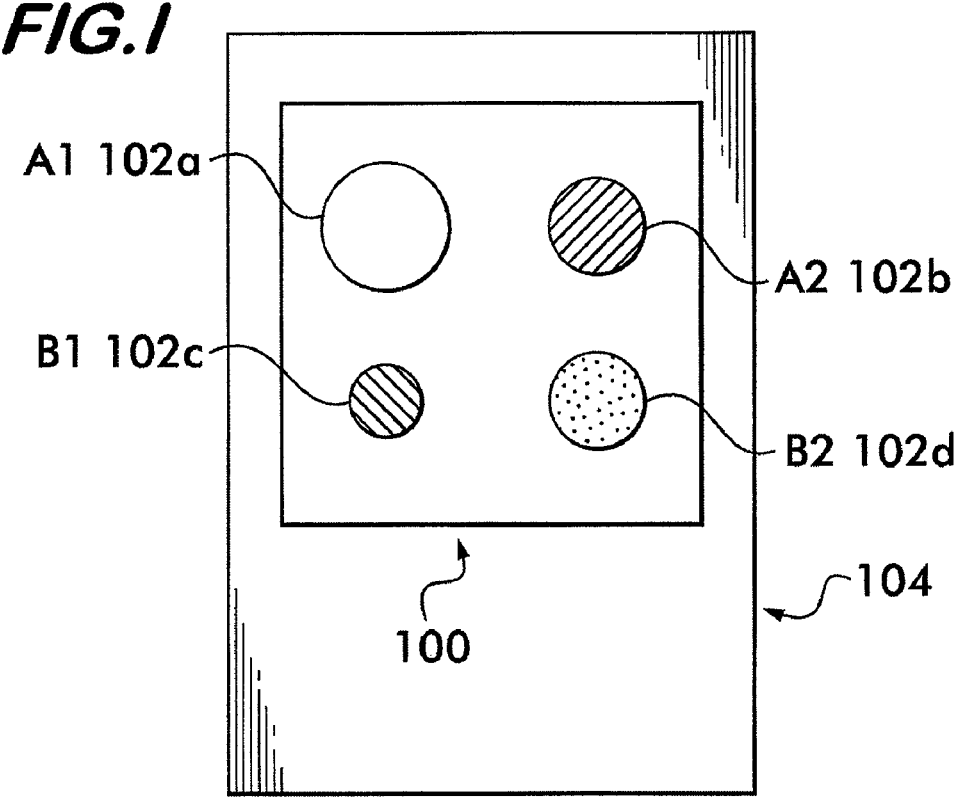

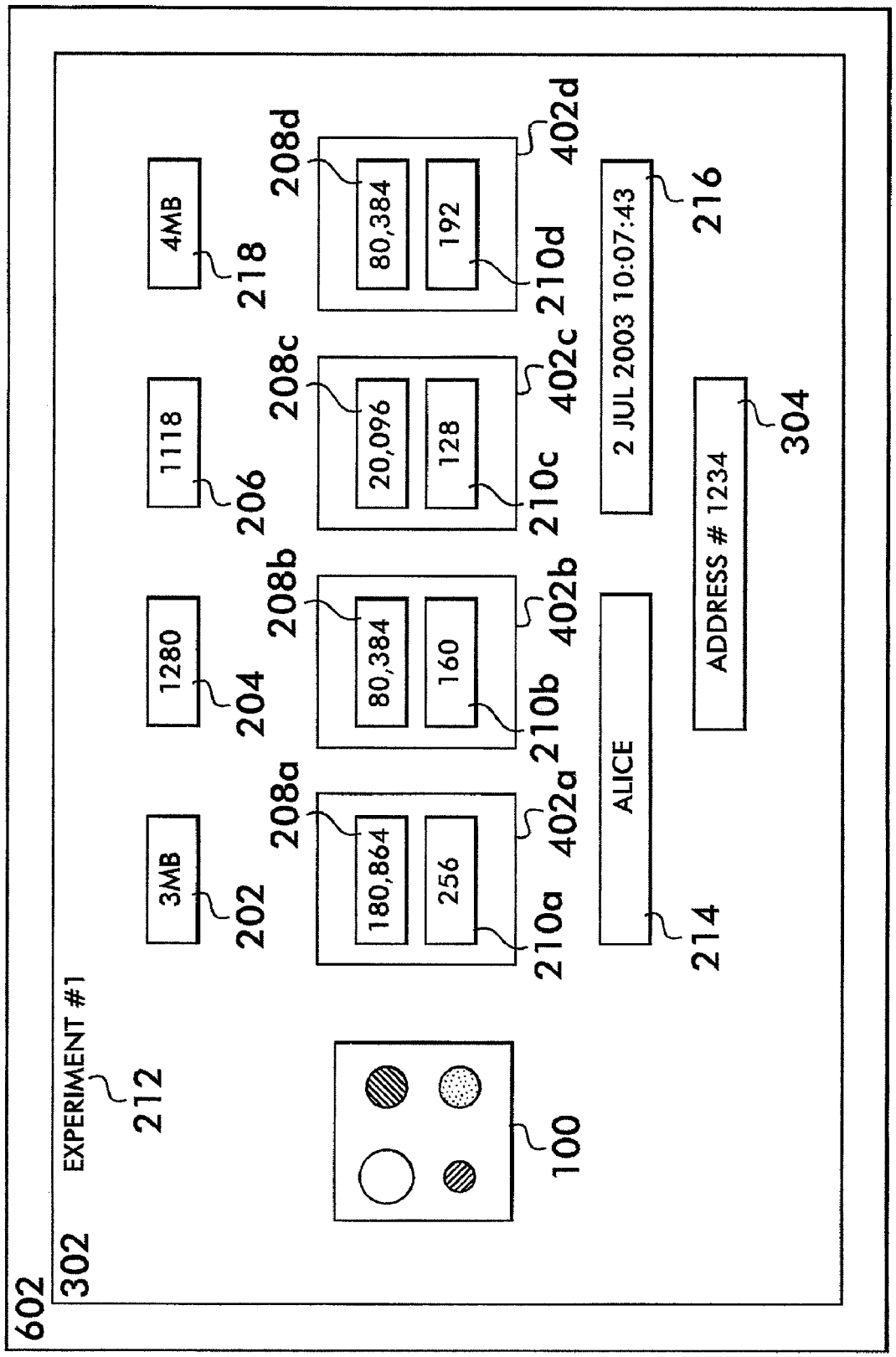

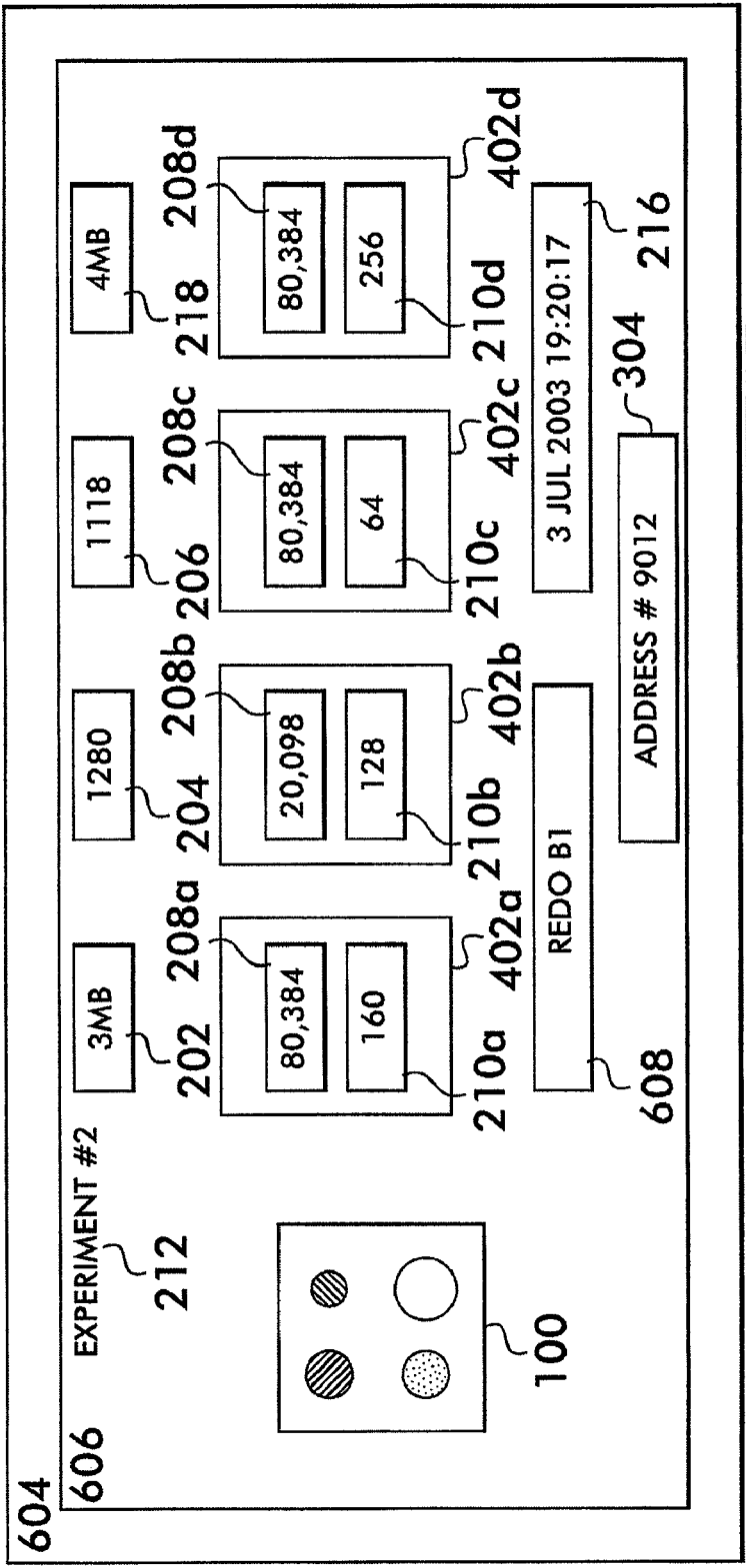
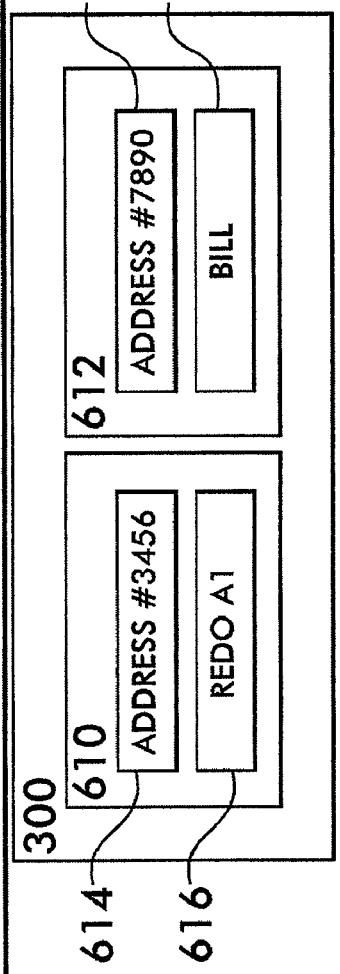

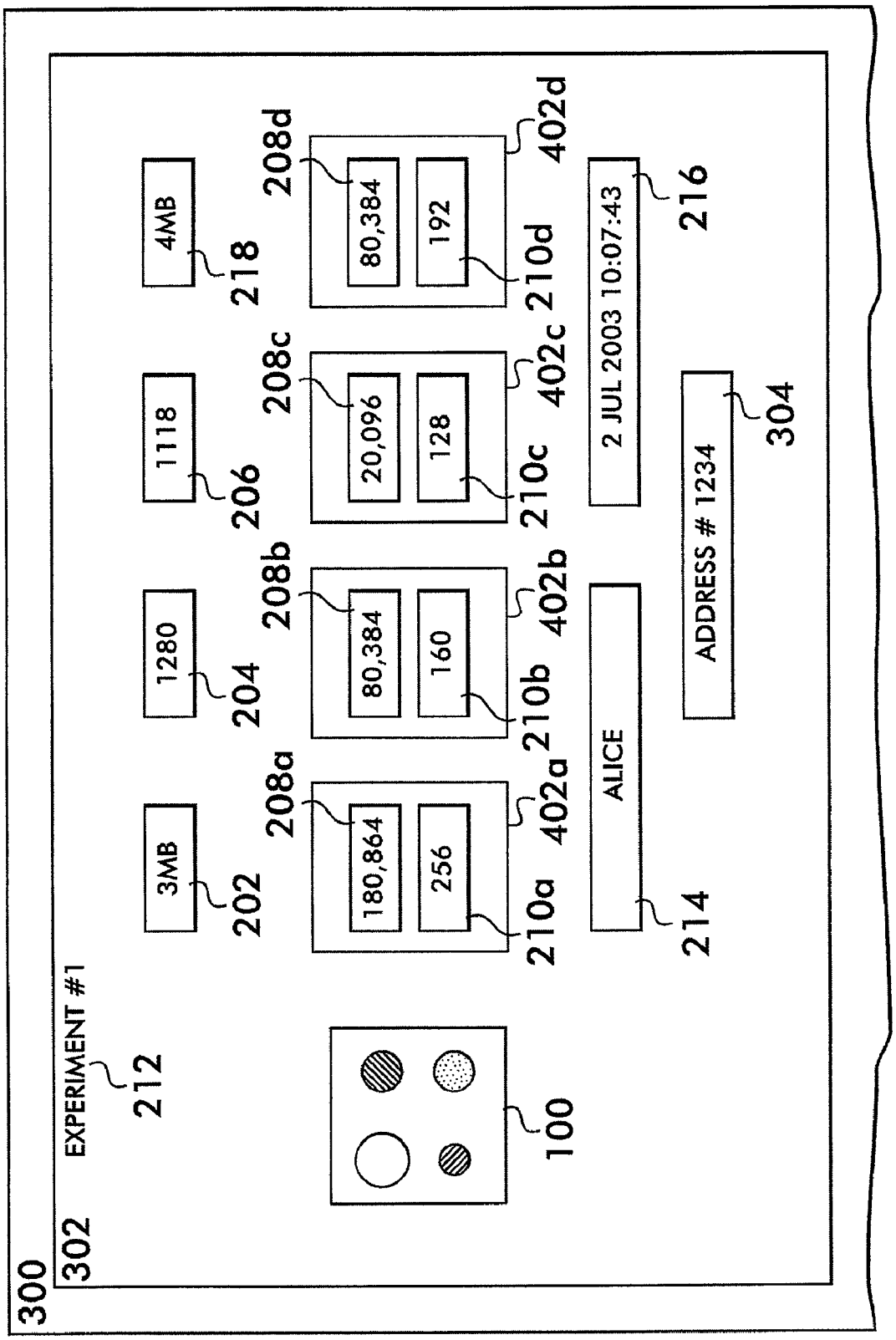

FIG. 9
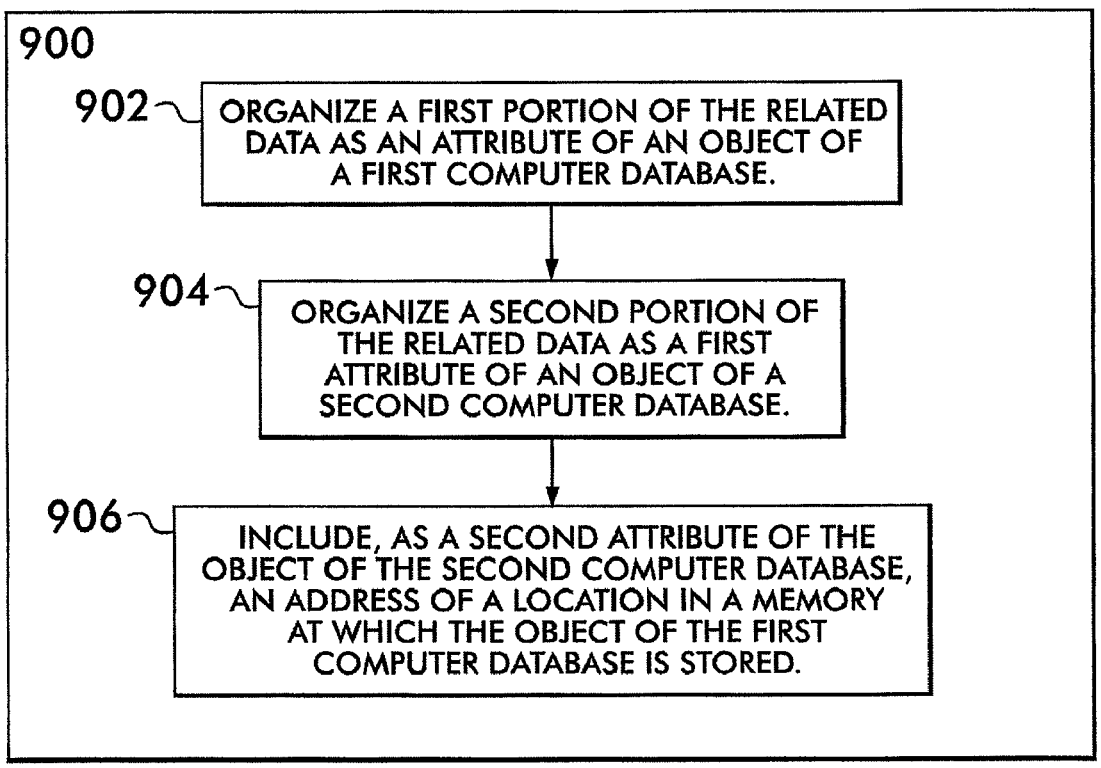
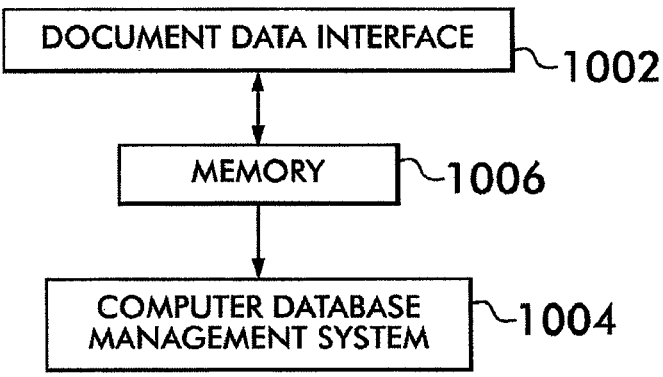
FIG. 10
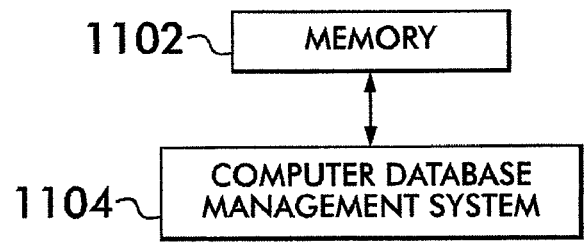
FIG. 11

METHOD, SYSTEM, AND COMPUTER PROGRAM PRODUCT FOR MANAGING DATA ASSOCIATED WITH A DOCUMENT STORED IN AN ELECTRONIC FORM

CROSS-REFERENCE TO RELATED APPLICATIONS

This application claims the benefit of U.S. Provisional Application No. 60/514,601, filed Oct. 28, 2003, which is incorporated herein in its entirety by reference.

BACKGROUND OF THE INVENTION

1. Field of the Invention

The present invention relates to computer databases.

2. Related Art

Advancements in digital image processing methods have enabled these technologies to become valuable tools for a host of applications. These include, but are not limited to, documenting work products in such fields as biochemistry, cell biology, pathology, genetics, forensics, geology, metallurgy, inspections of electron devices, quality control applications, material failure analysis, and the like. Digital image processing methods enable pictorial data to be manipulated in ways that enhance the means by which humans can interpret this data. Digital image processing methods typically use computer-processed algorithms or user-operated computer graphics tools. With digital image processing, a picture is not only "worth a thousand words," but also a source of a substantial amount of data about the subject(s) and the background in the digital image. In general, what is needed is a computer database management system for managing data associated with documents stored in an electronic form. Preferably, such a computer database management system would also be configured to support performing queries or data mining of relevant data at a high rate.

SUMMARY OF THE INVENTION

The present invention comprises a method, system, and computer program product for managing data associated with a document stored in an electronic form. The document can be a part of a file. The present invention can use computer processed algorithms, user-operated computer graphics tools, or both to have data derived from or assigned to the document or the file. The data can be, but is not necessarily, metadata. Computer processed algorithms and user-operated computer graphics tools can be thought of as representing opposite ends of a spectrum of methods by which data can be derived from or assigned to a document or a file. At one end of the spectrum, the derivation or assignment of data is performed automatically. At the other end of the spectrum, a user manually derives or assigns data.

In the present invention, first data is derived from the document, second data is assigned to the document, or both. The first data, the second data, or both are organized as attributes of an object of a first computer database. At least one attribute is organized as a child object of the object. The at least one attribute is associated with a feature of the document. Optionally, an attribute is moved from the object of the first computer database to an object of a second computer database and an address of a location in a memory at which the object of the second computer database is stored is added as a new attribute of the object of the first computer database.

Further embodiments, features, and advantages of the present invention, as well as the structure and operation of the various embodiments of the present invention, are described in detail below with reference to the accompanying drawings. Each feature or advantage is not necessarily required for all embodiments of the present invention.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art to make and use the invention.

FIG. 1 illustrates an exemplary image in which associated data are managed in an embodiment of the present invention.

FIG. 2 illustrates exemplary data derived from and assigned to the image.

FIG. 6 illustrates another exemplary relationship among databases.

FIG. 9 is a flow chart that illustrates a method 900 for managing related data stored in a plurality of computer databases in an embodiment of the present invention.

FIG. 10 is a block diagram of a system 1000 for managing data associated with a document stored in an electronic form in an embodiment of the present invention.

FIG. 11 is a block diagram of a system 1100 for managing related data stored in a plurality of computer databases in an embodiment of the present invention.

Figure 3:
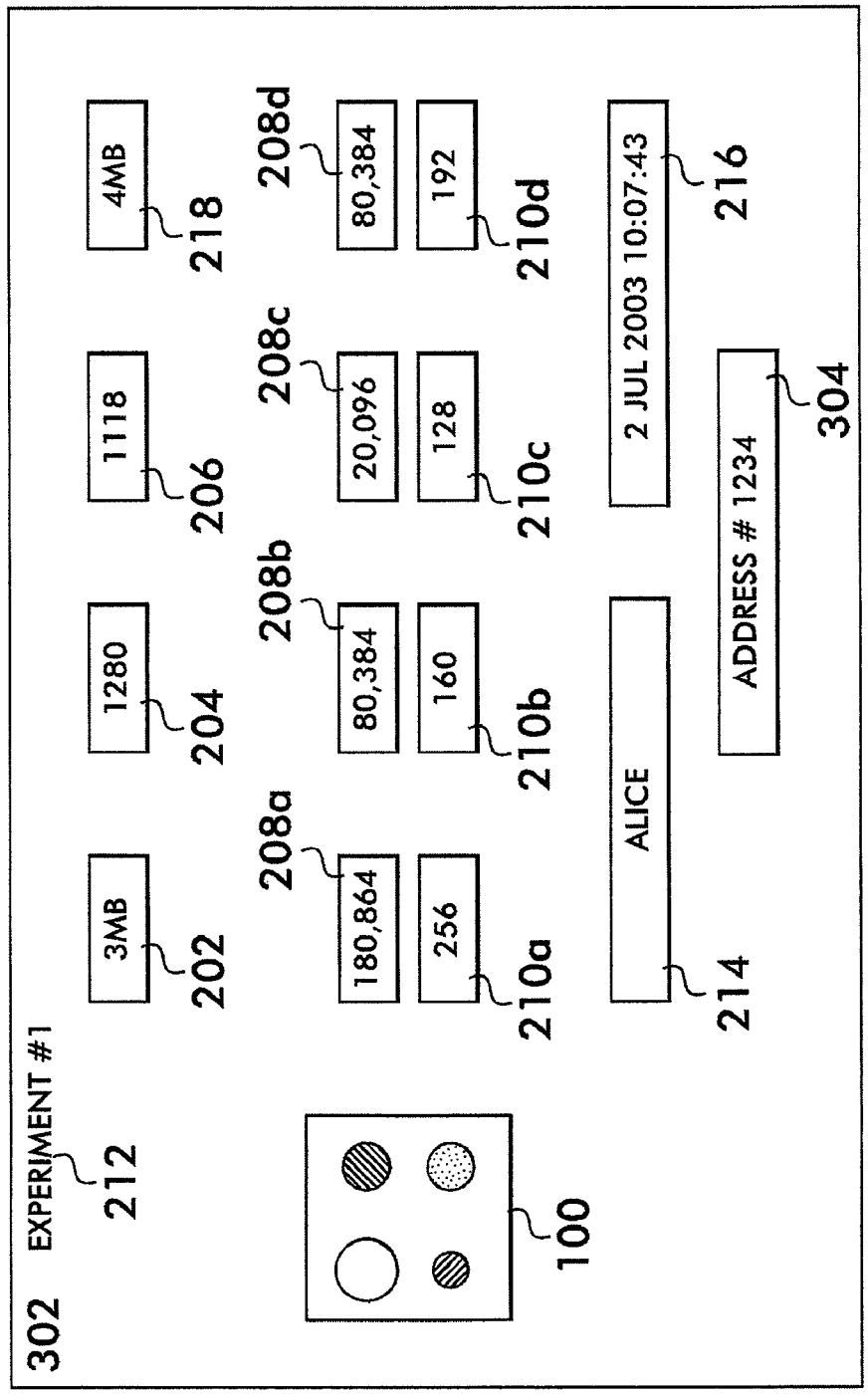
FIG. 3 illustrates an exemplary object, in a database, in which data derived from and assigned to the image are organized.

The preferred embodiments of the invention are described with reference to the figures where like reference numbers indicate identical or functionally similar elements. Also in the figures, the left most digit(s) of each reference number identifies the figure in which the reference number is first used.

DETAILED DESCRIPTION OF THE PREFERRED EMBODIMENTS

Overview

The present invention comprises a method, system, and computer program product for managing data associated with a document stored in an electronic form. If the document is an image, then management of the data is also known as image informatics. Among other attributes, the data can describe complex features found in an image. The document can be a part of a file. The present invention can use computer processed algorithms, user-operated computer graphics tools, or both to have data derived from or assigned to a document or a file.

Computer processed algorithms and user-operated computer graphics tools can be thought of as representing opposite ends of a spectrum of methods by which data can be derived from or assigned to a document or a file. At one end of the spectrum, the derivation or assignment of data is performed automatically. At the other end of the spectrum, a user manually derives or assigns data. More typically, data are derived or assigned by a combination of automatic and manual processes. For example, usually, a user initiates computer processed algorithms to derive or to assign data automatically, or is assisted by user-operated computer graphics tools to derive or to assign data manually. As the arts of deriving data from and assigning data to documents and files progress, data that are currently derived or assigned by mostly manual methods may later be derived or assigned by predominantly automatic processes. Accordingly, the present invention is not limited to current state of the art computer processed algorithms and user-operated computer graphics tools, but is also applicable to future developments in these technologies.

Examples of data that can currently be derived from or assigned to a document or a file with computer processed algorithms include signatures, thumbnails, and other image related attributes; file signatures and other file related attributes; grain sizing and other material analyses; edge detection and analysis; image feature counting and analysis; histograms; and line profiles. Computer processed algorithms can be based upon, but are not limited to, digital image processing methods such as background subtraction, thresholding, smoothing, adaptive filtering, edge enhancements, contrast enhancements, and histogram equalizations. Such methods are known to those of skill in the art.

Examples of data that can currently be derived from or assigned to a document or a file with user-operated computer graphics tools include measurements (e.g., distances, angles, etc.) made by a user of portions of subject(s) in an image, textual annotations made by a user and assigned to the document or the file via an overlay, Boolean values (e.g., true or false) assigned by the user, an identity of the document or the file, a time at which the document or the file was produced, and a name of an individual associated with the document or the file. Some of these can be obtained with the assistance of overlay templates. User-operated computer graphics tools can be based upon, but are not limited to, character user interfaces (e.g., keyboards) and graphical user interfaces.

Generally, a graphical user interface is a system comprising hardware, software, firmware, or any combination thereof that allows a user to interface with a computer via its display system. Characteristics of a graphical user interface can include, but are not limited to, a bit-mapped display, an Ethernet® network for transferring data and commands, an optical cursor control device (e.g., mouse, trackball, stylus, touch pad, touch screen, or the like), windowed display of operations, icon-initiated programs, and menus for programming options. Apple® Macintosh® and Microsoft® Windows™, for example, are applications of graphical user interfaces that can provide a basis for a graphical user interface of the present invention. The present invention is not limited to these examples, but is applicable to other existing and future-developed graphical user interfaces.

The data derived from or assigned to a document or a file can include metadata. Metadata are data about the document or the file that can be used to identify it in an index. Such metadata can include, but are not limited to, some of the data defined by the Dublin Core Metadata Initiative® hosted by OCLC Research of Dublin, Ohio, U.S.A. The technical standards of the Dublin Core Metadata Initiative® are incorporated herein in their entirety by reference.

The computer processed algorithms and user-operated computer graphics tools used to derive data from or assign data to documents or files are incorporated in, for example, the Image-Pro® and IQstudio™ families of products offered by Media Cybernetics Inc. of Silver Spring, Md., U.S.A.

In an application, the present invention provides a database that allows a user to capture, store, and organize image related data in real time as the user is looking at or analyzing images. Later, the data can be queried, archived more permanently, analyzed further using data mining tools, or any combination of the foregoing. Data irrelevant to a particular analysis can be stored in a separate database and indexed to the database of the present invention so that queries or data mining of relevant data in the database of the present invention can be performed at a high rate. Because the database of the present invention can index data from different databases, the database of the present invention can automatically update its schema (the data structure information) as needed as data is accessed from different databases.

Preferably, the database of the present invention is an object oriented database. An object oriented database organizes related data as elements in a set. The set is known as an object and is defined by a type. The elements are known as attributes. A first object can be an attribute of a second object. The first object is known as a child object and the second object is known as a parent object. The FastObjects™ family of products, offered by Poet GmbH of Karlsruhe, Germany, is an example of object oriented databases in which the present invention can be implemented. However, the skilled artisan recognizes other database architectures by which the present invention can be implemented. Accordingly, the present invention is not limited to an object oriented architecture.

For convenience, the present invention is described in the context of images of results of DNA genotyping experiments as displayed in microarrays. However, it should be understood that the present invention can be adapted for use in many other applications including, but not limited to, work products in such fields as biochemistry, cell biology, pathology, genetics, forensics, geology, metallurgy, inspections of devices with feature sizes substantially at or less than a micron, quality control applications, and material failure analysis. Furthermore, the present invention can be used to manage data associated with documents of all types and is not limited to managing data associated with images.

FIG. 1 illustrates an exemplary image in which associated data are managed in an embodiment of the present invention. An image 100 shows a sample of results of a first DNA genotyping experiment as displayed in a microarray. The microarray has, for example, four result sites: A1 102$a$, A2 102$b$, B1 102$c$, and B2 102$d$. Image 100 can be, but is not necessarily, a part of a file 104.

FIG. 2 illustrates exemplary data derived from and assigned to the image. Data derived from image 100 are defined, for example, by the following attributes (and associated data types): an image size 202 (e.g., number of bytes) of image 100, a height 204 (e.g., number of pixels) of image 100, a width 206 (e.g., number of pixels) of image 100, an area 208$a$, 208$b$, 208$c$, and 208$d$ (e.g., number of pixels) of each of the four result sites, and an intensity 210$a$, 210$b$, 210$c$, and 210$d$ of each the four result sites (e.g., average of values stored in the pixels that define the area of a result site). Data assigned to image 100 are defined, for example, by the following attributes (and associated types): an identity 212 (e.g., series of ASCII characters) of the first DNA genotyping experiment and a name 214 (e.g., series of ASCII characters) of an individual who conducted the first DNA genotyping experiment. If image 100 was captured (at any time), then the data assigned to image 100 can include a time 216 (e.g., series of ASCII characters) at which image 100 was captured. If image 100 is a part of file 104, then the data assigned to image 100 can include data derived from or assigned to file 104. Data derived from or assigned to file 104 can be defined, for example, by the following attribute (and associated data type): a file size 218 (e.g., number of bytes) of file 104.

FIG. 3 illustrates an exemplary object, in a database, in which data derived from and assigned to the image are organized. In a database of the present invention 300, identity 212, for example, defines an object 302. The remaining data are attributes of object 302. For example, each of image size 202; height 204; width 206; areas 208a, 208b, 208c, and 208d; intensities 210a, 210b, 210c, and 210d; and name 214 is an attribute of object 302. Optionally, object 302 can include image 100 (or a reproduction of image 100) as an attribute. If data assigned to image 100 includes time 216, then object 302 can include an attribute for time 216. If image 100 is a part of file 104, then object 302 can include an attribute for file size 218, an attribute for a memory location 304 (e.g., address) at which file 104 is stored, or both.

Figure 4:
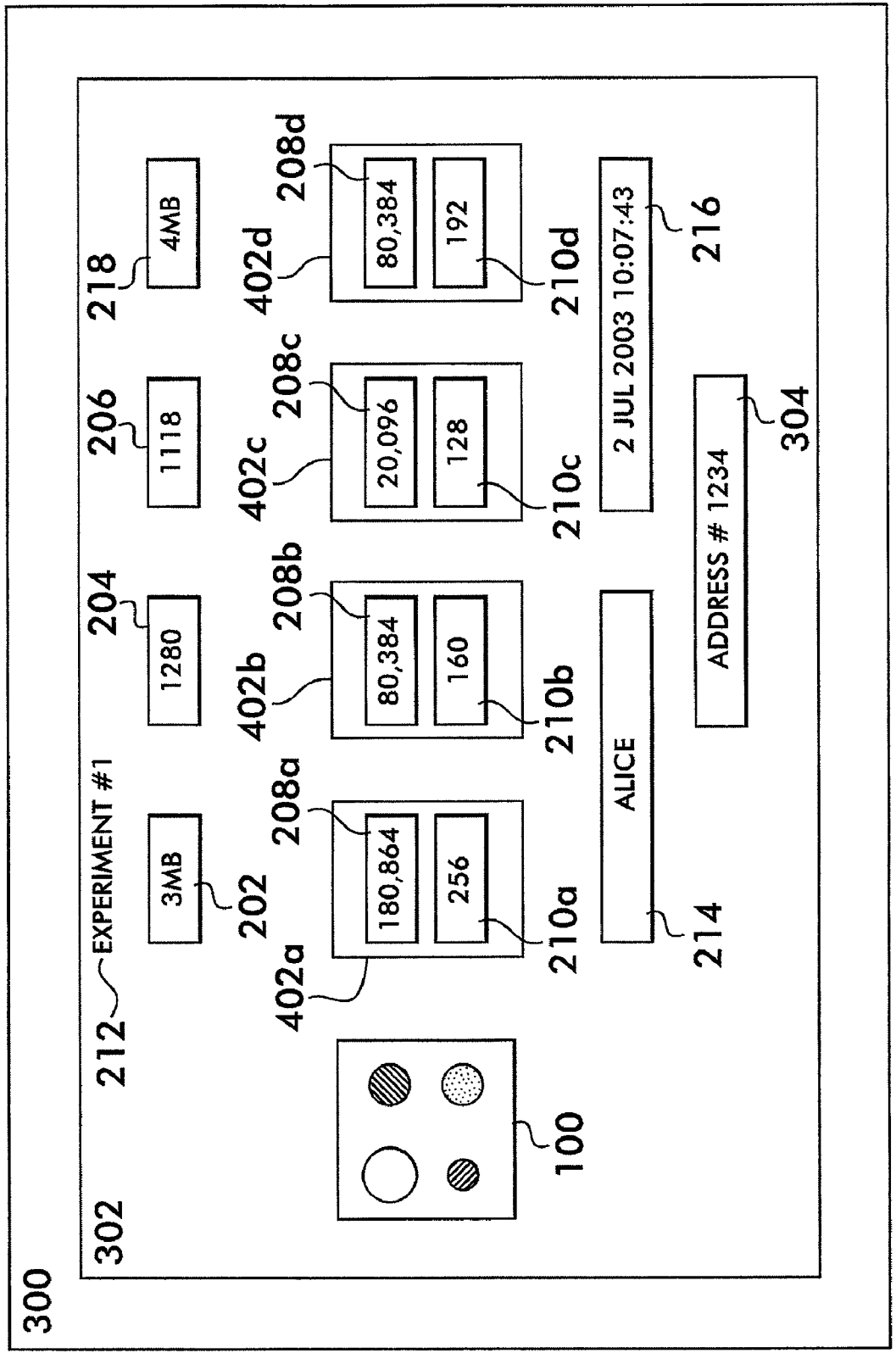
FIG. 4 illustrates an alternative organization of the object.

FIG. 4 illustrates an alternative organization of the object. Data related to each of result sites A1 102a, A2 102b, B1 102c, and B2 102d can be organized as a child object of object 302. For example, attributes for area 208a and intensity 210a can be organized as child object 402a, attributes for area 208b and intensity 210b can be organized as child object 402b, attributes for area 208c and intensity 210c can be organized as child object 402c, and attributes for area 208d and intensity 210d can be organized as child object 402d.

So that queries and data mining of relevant data in object 302 can be performed at a high rate, the present invention allows data irrelevant to a particular analysis to be stored in a separate database and indexed to database of the present invention 300. For example, a user may desire to perform queries or data mining of data related to result sites A1 102a, A2 102b, B1 102c, and B2 102d, but consider the remaining data of object 302 irrelevant to a particular analysis. In this case, the remaining data of object 302 can be stored in a separate database and indexed to database of the present invention 300 so that queries and data mining of data related to result sites A1 102a, A2 102b, B1 102c, and B2 102d can be performed at a high rate.

Figure 5:
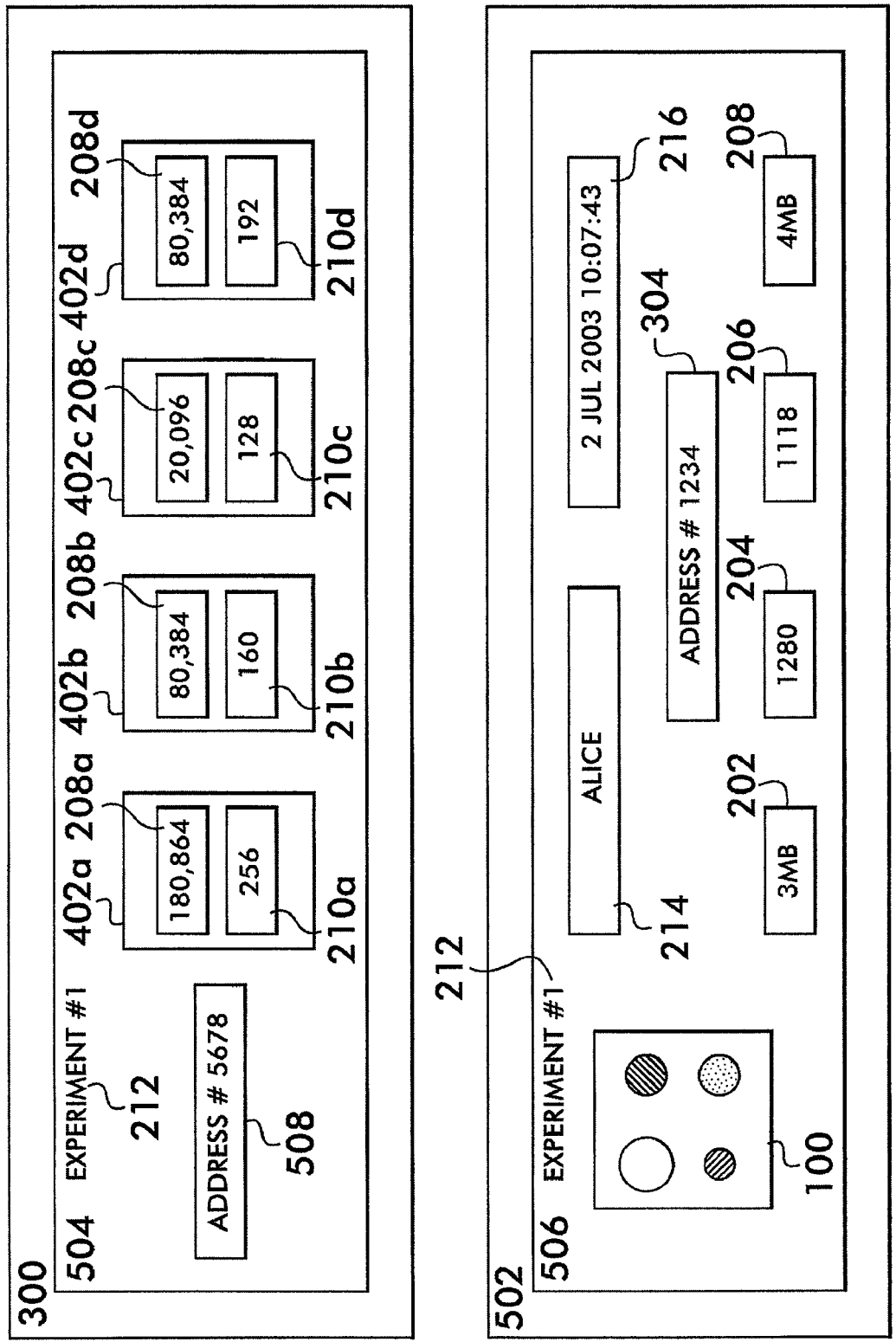
FIG. 5 illustrates an exemplary relationship between databases.

FIG. 5 illustrates an exemplary relationship between databases. This example relationship includes database of the present invention 300 and a second database 502. In database of the present invention 300, an object 504 is defined by identity 212. Object 504 includes child objects 402a, 402b, 402c, and 402d from object 302. In second database 502, an object 506 is also defined by identity 212. Object 506 includes the remaining attributes from object 302. In database of the present invention 300, object 504 also includes an attribute for a memory location 508 (e.g., address) at which object 506 is stored. With this relationship, a user can perform queries or data mining data related to result sites A1 102a, A2 102b, B1 102c, and B2 102d at a high rate. Furthermore, access to the remaining data related to image 100 is maintained via object 506 so that queries and data mining can also be performed for this data.

Because database of the present invention 300 can index data from different databases, database of the present invention 300 can automatically update its schema (the data structure information) as needed as data is accessed from different databases.

FIG. 6 illustrates another exemplary relationship among databases. This example relationship includes database of the present invention 300, a third database 602, and a fourth database 604. Third database 602 includes object 302 for data related to the first DNA genotyping experiment as these data were originally derived or assigned. Fourth database 604 includes an object 606 for data related to a second DNA genotyping experiment as these data were originally derived or assigned. The data of the second DNA genotyping experiment is organized in object 606 in a manner that corresponds to the organization of the data in object 302. However, rather than having an attribute for name 214 of an individual who conducted the second DNA genotyping experiment, object 606 has an attribute for an overlay of textual annotations 608 (e.g., series of ASCII characters).

Database of the present invention 300 includes a first object 610 and a second object 612. First object 610 corresponds to object 302 and second object 612 corresponds to object 606. First object 610 includes an attribute for a memory location 614 (e.g., address) at which object 302 is stored and an attribute for an overlay of textual annotations 616 (e.g., series of ASCII characters). Second object 612 includes an attribute for a memory location 618 (e.g., address) at which object 606 is stored and an attribute for a name 620 (e.g., series of ASCII characters). With this relationship, a user can access corresponding sets of data for the first DNA genotyping experiment and the second DNA genotyping experiment even though the sets of data that were originally derived or assigned for the first DNA genotyping experiment and the second DNA genotyping experiment are not corresponding. Advantageously, the data related to each of the DNA genotyping experiments are maintained in the corresponding databases as these data were originally derived or assigned.

Figure 7B:
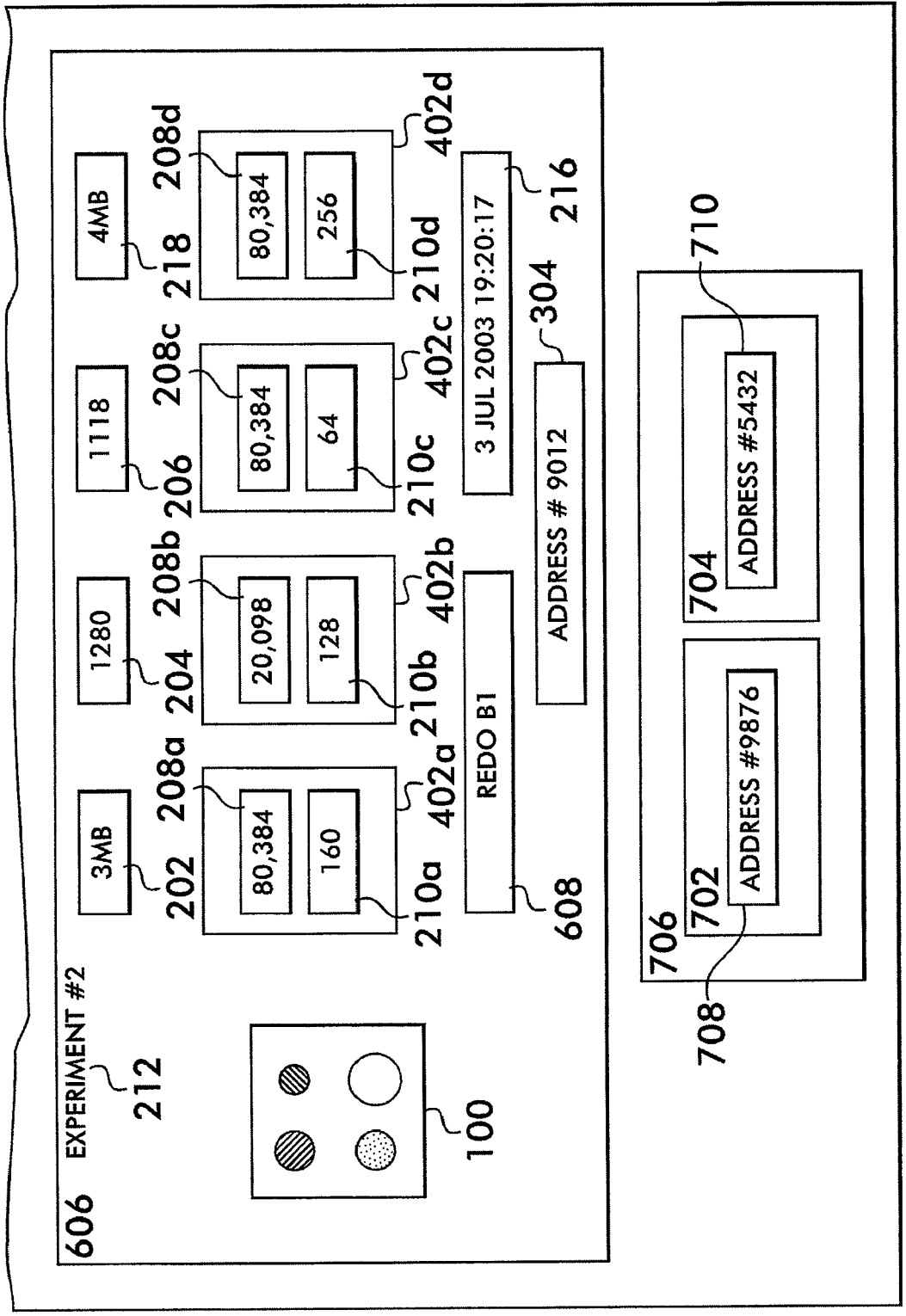
FIG. 7 illustrates exemplary query objects.

FIG. 7 illustrates exemplary query objects. In this example, database of the present invention 300 includes object 302, object 606, a third object 702, a fourth object 704, and a fifth object 706. Third object 702 is a query object. Third object 702 is, for example, defined as the results of querying object 302 and object 606 for data related to result site A1 102a for the first DNA genotyping experiment and the second DNA genotyping experiment. Third object 702 includes an attribute for a memory location 708 (e.g., address) at which subset 402a for the first DNA genotyping experiment is stored and an attribute for a memory location 710 (e.g., address) at which subset 402a for the second DNA genotyping experiment is stored. Fourth object 704 is also a query object. Fourth object 704 is, for example, defined as the results of querying object 302 and object 606 for data related to result site A2 102b for the first DNA genotyping experiment and the second DNA genotyping experiment. Fourth object 704 includes an attribute for a memory location (e.g., address) at which subset 402b for the first DNA genotyping experiment is stored and an attribute for a memory location (e.g., address) at which subset 402b for the second DNA genotyping experiment is stored. Third object 702 and fourth object 704 can be child objects of fifth object 706. Fifth object 706 is defined as the results of querying object 302 and object 606 for data related to result site A1 102a and result site A2 102b for the first DNA genotyping experiment and the second DNA genotyping experiment.

Methods

Figure 8:
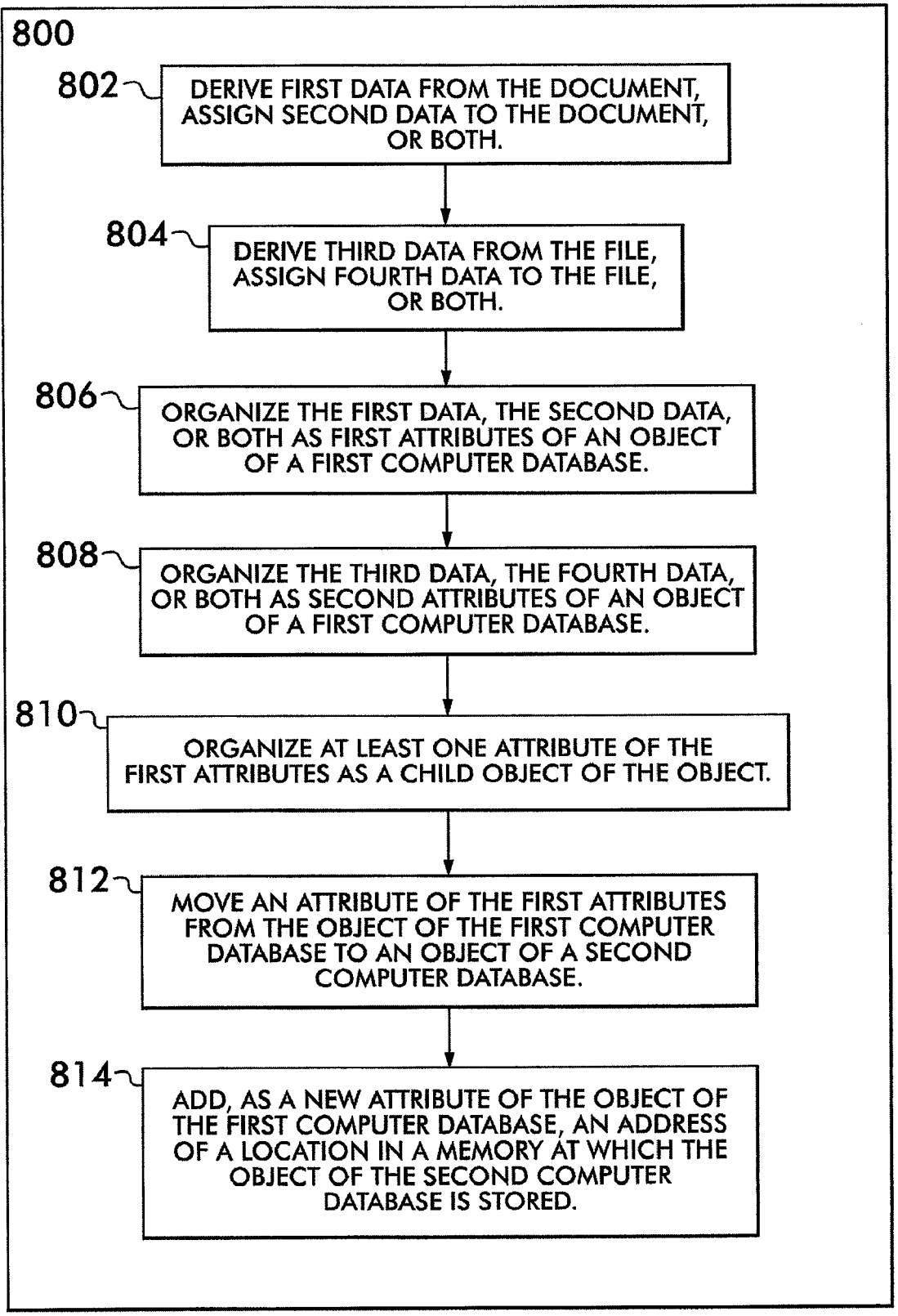
FIG. 8 is a flow chart that illustrates a method 800 for managing data associated with a document stored in an electronic form in an embodiment of the present invention.

FIG. 8 is a flow chart that illustrates a method 800 for managing data associated with a document stored in an electronic form in an embodiment of the present invention. Method 800 has several embodiments, which are differentiated below as optional steps.

In method 800, at a step 802, first data are derived from the document, second data are assigned to the document, or both. Data can be derived, assigned, or both with a computer processed algorithm, a user-operated computer graphics tool, or both. The first data, the second data, or both can include metadata. Optionally, the document is an image. The image can be captured with an electronic imaging device. The first data, the second data, or both can include a time at which the image was captured. The image or a reproduction of the image can be included as an attribute of the first attributes.

Optionally, the document is a part of a file. An address of a location in a memory at which the file is stored can be included as an attribute of the first attributes. Optionally, at a step 804, third data are derived from the file, fourth data are assigned to the file, or both with the computer processed algorithm, the user-operated computer graphics tool, or both.

At a step 806, the first data, the second data, or both are organized as first attributes of an object of a first computer database.

Optionally, at a step 808, third data, fourth data, or both are organized as second attributes of the object of the first computer database.

At a step 810, at least one attribute of the first attributes is organized as a child object of the object. The at least one attribute is associated with a feature of the document.

Optionally, at a step 812, an attribute of the first attributes is moved from the object of the first computer database to an object of a second computer database. Then, at a step 814, an address of a location in a memory at which the object of the second computer database is stored is added as a new attribute of the object of the first computer database.

FIG. 9 is a flow chart that illustrates a method 900 for managing related data stored in a plurality of computer databases in an embodiment of the present invention. In method 900, at a step 902, a first portion of the related data is organized as an attribute of an object of a first computer database. At a step 904, a second portion of the related data is organized as a first attribute of an object of a second computer database. At a step 906, an address of a location in a memory at which the object of the first computer database is stored is included as a second attribute of the object of the second computer database.

Systems

FIG. 10 is a block diagram of a system 1000 for managing data associated with a document stored in an electronic form in an embodiment of the present invention. System 1000 comprises a document data interface 1002, a computer database management system 1004, and a memory 1006.

Document data interface 1002 is configured to support deriving first data from the document, assigning second data to the document, or both. The first data, the second data, or both can include metadata. Document data interface 1002 can include a computer processed algorithm, a user-operated computer graphics tool, a graphical user interface, a character user interface, or any combination of the foregoing. Optionally, document data interface 1002 can be further configured to support deriving third data from a file that includes the document, assigning fourth data to the file, or both.

Computer database management system 1004 is configured to organize the first data, the said second data, or both as first attributes of an object of a first computer database and to organize at least one attribute of the first attributes as a child object of the object. The at least one attribute is associated with a feature of the document. Preferably, computer database management system 1004 is an object oriented computer databases management system. Optionally, computer database management system 1004 is further configured to organize the third data, the fourth data, or both as second attributes of the object of the first computer database. Optionally, computer database management system 1004 is further configured to move an attribute of the first attributes from the object of the first computer database to an object of a second computer database and to add, as a new attribute of the object of the first computer database, an address of a location in memory 1006 at which the object of the second computer database is stored.

Memory 1006 is configured to store the document and the first computer database. Memory 1006 is also configured to store the first data, the second data, or both. Memory 1006 is coupled to document data interface 1002 and computer database management system 1004. Optionally, memory 1006 is further configured to store the third data, the fourth data, or both. Optionally, memory 1006 is further configured to store the second computer database.

FIG. 11 is a block diagram of a system 1100 for managing related data stored in a plurality of computer databases in an embodiment of the present invention. System 1100 comprises a memory 1102 and a computer database management system 1104. Memory 1102 is configured to store a first computer database and a second computer database. Computer database management system 1104 is configured to organize a first portion of the related data as an attribute of an object of the first computer database, to organize a second portion of the related data as a first attribute of an object of the second computer database, and to include, as a second attribute of the object of the second computer database, an address of a location in memory 1102 at which the object of the first computer database is stored. Computer database management system 1104 is coupled to memory 1102.

Computer Program Products

The present invention also comprises a computer program product for managing data associated with a document stored in an electronic form. The computer program product has computer program code means embodied in a computer useable medium. The computer program code means comprises a first computer program code means, a second computer program code means, and a third computer program code means.

The first program code means causes a processor, allows a user, or both to derive first data from the document, assign second data to the document, or both with a computer processed algorithm, a user-operated computer graphics tool, or both. The first data, the second data, or both can include metadata. If the document is an image that was captured with an electronic imaging device, then the first data, the second data, or both can include a time at which the image was captured.

If the document is a part of a file, then the computer program code means can further comprise a fourth program code means. The fourth program code means causes the processor, allows the user, or both to derive third data from the file, assign fourth data to the file, or both with the computer processed algorithm, the user-operated computer graphics tool, or both.

The second program code means causes the processor, allows the user, or both to organize the first data, the second data, or both as first attributes of an object of a first computer database. If the document is an image, then the image or a reproduction of the image can be included as an attribute of the first attributes. If the document is a part of a file, then an address of a location in a memory at which the file is stored can be included as an attribute of the first attributes.

If the document is a part of a file, then the computer program code means can further comprise a fifth program code means. The fifth program code means causes the processor, allows the user, or both to organize the third data, the fourth data, or both as second attributes of the object of the first computer database.

The third program code means causes the processor, allows the user, or both to organize at least one attribute of the first attributes as a child object of the object. The at least one attribute is associated with a feature of the document.

Optionally, the computer program code means further comprises a sixth program code means and a seventh program code means. The sixth program code means causes the processor, allows the user, or both to move an attribute of the first attributes from the object of the first computer database to an object of a second computer database. The seventh program code means causes the processor, allows the user, or both to add, as a new attribute of the object of the first computer database, an address of a location in a memory at which the object of the second computer database is stored.

The present invention also comprises a computer program product for managing related data stored in a plurality of computer databases. The computer program product has computer program code means embodied in a computer useable medium. The computer program code means comprises a first computer program code means, a second computer program code means, and a third computer program code means. The first program code means causes the processor, allows the user, or both to organize a first portion of the related data as an attribute of an object of a first computer database. The second program code means causes the processor, allows the user, or both to organize a second portion of the related data as a first attribute of an object of a second computer database. The third program code means causes the processor, allows the user, or both to include, as a second attribute of the object of the second computer database, an address of a location in a memory at which the object of the first computer database is stored.

Environment of the Present Invention

Figure 12:
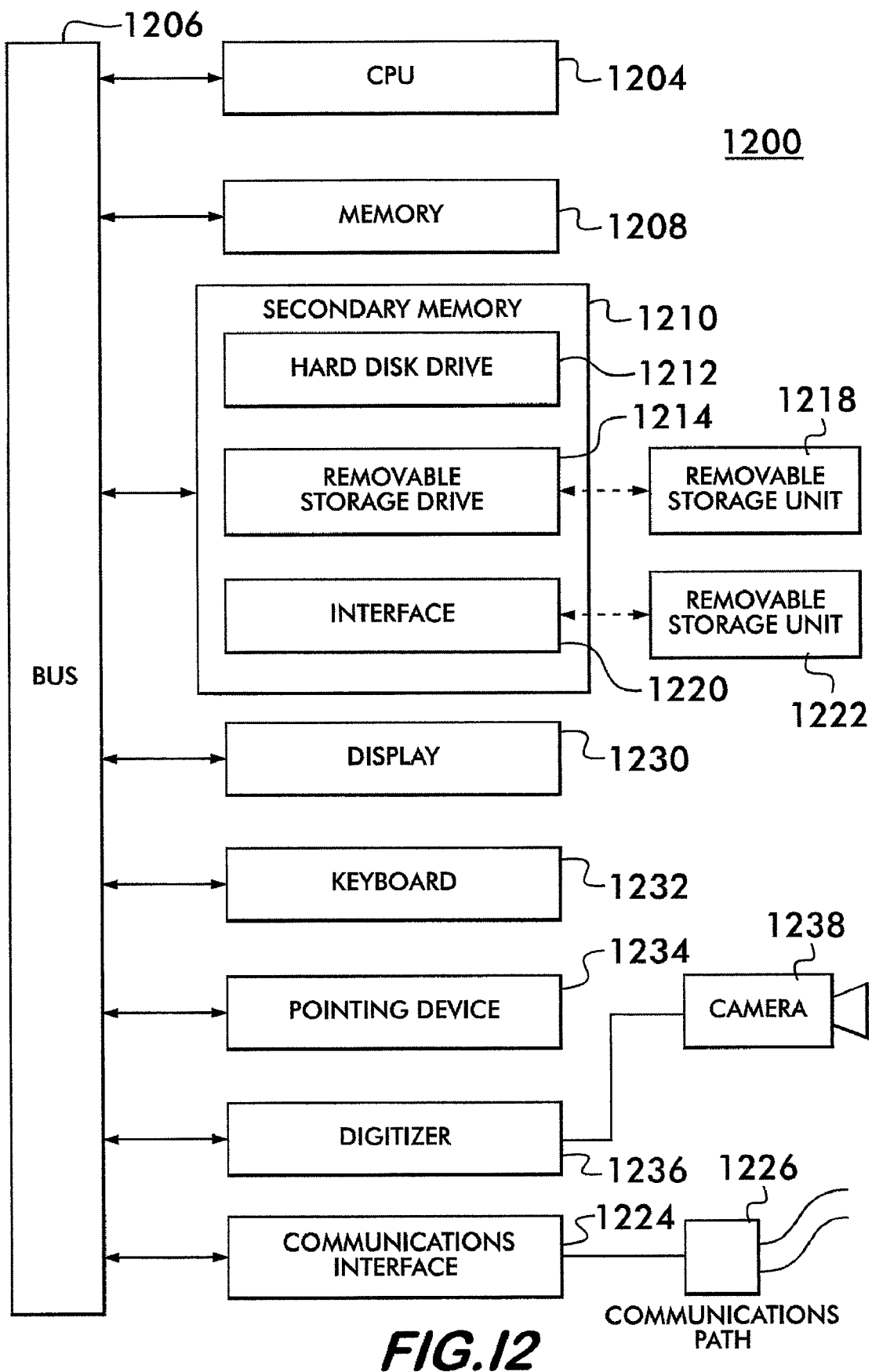
FIG. 12 is a block diagram of an example computer system 1200 that can support an embodiment of the present invention.

FIG. 12 is a block diagram of an example computer system 1200 that can support an embodiment of the present invention. Computer system 1200 includes one or more processors, such as a central processing unit (CPU) 1204. The CPU 1204 is connected to a communications bus 1206. Various software embodiments are described in terms of this example computer system. After reading this description, it will be apparent to a person skilled in the relevant art how to implement the present invention using other computer systems, computer architectures, or both.

Computer system 1200 also includes a main memory 1208, preferably random access memory (RAM), and can also include a secondary memory 1210. The secondary memory 1210 can include, for example, a hard disk drive 1212 and/or a removable storage drive 1214, representing a floppy disk drive, a magnetic tape drive, an optical disk drive, etc. The removable storage drive 1214 reads from and/or writes to a removable storage unit 1218 in a well-known manner. Removable storage unit 1218 represents a floppy disk, magnetic tape, optical disk, etc., which is read by and written to removable storage drive 1214. As will be appreciated, the removable storage unit 1218 includes a computer usable storage medium having stored therein computer software, data, or both.

The computer system 1200 also includes conventional hardware such as a display 1230, a keyboard 1232, and a pointing device 1234. A digitizer 1236 and a camera 1238 can be used for capturing images to process according to the present invention. Alternatively, images can be retrieved from any of the above-mentioned memory units, or via a communications interface 1224. In alternative embodiments, secondary memory 1210 may include other similar means for allowing computer programs or other instructions to be loaded into computer system 1200. Such means can include, for example, a removable storage unit 1222 and an interface 1220. Examples can include a program cartridge and cartridge interface (such as that found in video game devices), a removable memory chip (such as an EPROM, or PROM) and associated socket, and other removable storage units 1222 and interfaces 1220 which allow software and data to be transferred from the removable storage unit 1222 to computer system 1200.

The communications interface 1224 allows software and data to be transferred between computer system 1200 and external devices via communications path 1226. Examples of communications interface 1224 can include a modem, a network interface (such as an Ethernet card), a communications port (e.g., RS-232), etc. Software and data transferred via communications interface 1224 are in the form of signals which can be electronic, electromagnetic, optical or other signals capable of being received by communications interface 1224 via communications path 1226. Note that communications interface 1224 provides a means by which computer system 1200 can interface to a network such as the Internet.

The present invention is described in terms of this example environment. Description in these terms is provided for convenience only. It is not intended that the invention be limited to application in this example environment. In fact, after reading the complete description, it will become apparent to a person skilled in the relevant art how to implement the present invention in alternative environments.

Software and Hardware Embodiments

The present invention is preferably implemented using software running (that is, executing) in an environment similar to that described above with respect to FIG. 12.

Computer programs (also called computer control logic) are stored in main memory and/or secondary memory 1210. Computer programs can also be received via communications interface 1224. Such computer programs, when executed, enable the computer system 1200 to perform the features of the present invention as discussed herein. In particular, the computer programs, when executed, enable the processor 1204 to perform the features of the present invention. Accordingly, such computer programs represent controllers of the computer system 1200.

In an embodiment where the present invention is implemented using software, the software may be stored in a computer program product and loaded into computer system 1200 using removable storage drive 1214, hard drive 1212 or communications interface 1224. Alternatively, the computer program product may be downloaded to computer system 1200 over communications path 1226. The control logic (software), when executed by the processor 1204, causes the processor 1204 to perform the functions of the present invention as described herein.

In another embodiment, the present invention is implemented primarily in hardware using, for example, hardware components such as application specific integrated circuits (ASICs). Implementation of a hardware state machine so as to perform the functions described herein will be apparent to persons skilled in the relevant art(s).

Conclusion

The embodiments of the present invention as described herein with respect to FIGS. 1-12 can be implemented in software, firmware, hardware or a combination thereof. While various embodiments of the present invention have been described above, it should be understood that they have been presented by way of example, and not limitation. It will be apparent to persons skilled in the relevant art that various changes in form and detail can be made therein without departing from the spirit and scope of the invention. Thus, the present invention should not be limited by any of the above-described exemplary embodiments, but should be defined only in accordance with the following claims and their equivalents.

What is claimed is:

1. A method for managing data associated with a document stored in an electronic form in a computer processor system having a memory and an output device, comprising the steps of:
   (1) deriving first data from the document or assigning second data to the document with at least one of a computer processed algorithm and a user-operated computer graphics tool, wherein the first data is other than data intentionally included in the document for a purpose of conveying information about at least one of the document and an object associated with the document;
   (2) organizing at least one of the first data and the second data as first attributes of a parent object of a first computer database stored in the memory of the computer processor system;
   (3) organizing at least one attribute of the first attributes as a child object of the parent object, wherein the at least one attribute is associated with a feature of the document;
   (4) moving an attribute of the first attributes from the parent object of the first computer database to an object of a second computer database stored in the memory of the computer processor system; and
   (5) adding, as a new attribute of the parent object of the first computer database, an address of a location in the memory of the computer processor system at which the object of the second computer database is stored;
   wherein the first computer database is configured so that a result of a query of the child object of the first computer database is produced on the output device at a higher rate than a result of a query of the parent object of the first computer database.

2. The method of claim 1, wherein the at least one of the first data and the second data includes metadata.

3. The method of claim 1, wherein the document is an image.

4. The method of claim 1, wherein the document is a part of a file.

5. The method of claim 4, wherein an address of a location in the memory of the computer processor system at which the file is stored is included as an attribute of the first attribute.

6. The method of claim 4, further comprising the steps of:
   (6) deriving third data from the file or assigning fourth data to the file with at least one of the computer processed algorithm and the user-operated computer graphics tool; and
   (7) organizing at least one of the third data and the fourth data as second attribute of the parent object of the first computer database.

7. A computer processor system for managing data associated with a document stored in an electronic form said computer processor system having a memory and an output device, comprising:
   a document data interface configured to support at least one of deriving first data from the document and assigning second data to the document, wherein the first data is other than data intentionally included in the document for a purpose of conveying information about at least one of the document and an object associated with the document;
   a computer database management system configured to organize at least one of said first data and said second data as first attributes of a parent object of a first computer database stored in said memory of said computer processor system and to organize at least one attribute of said first attributes as a child object of said parent object, wherein said at least one attribute is associated with a feature of the document; and
   said memory of said computer processor system configured to store the document, said first computer database, and said at least one of said first data and said second data, said memory of said computer processor system coupled to said document data interface and said computer database management system;
   wherein the first computer database is configured so that a result of a query of the child object of the first computer database is produced on the output device at a higher rate than a result of a query of the parent object of the first computer database; and
   wherein said memory of said computer processor system is further configured to store a second computer database in a second computer system and said computer database management system is further configured to move an attribute of said first attributes from said parent object of said first computer database to an object of said second computer database and to add, as a new attribute of said parent object of said first computer database, an address of a location in said memory of said computer processor system at which said object of said second computer database is stored.

8. The system of claim 7, wherein said document data interface includes a computer processed algorithm.

9. The system of claim 7, wherein said document data interface includes a user-operated computer graphics tool.

10. The system of claim 7, wherein said document data interface includes a graphical user interface.

11. The system of claim 7, wherein said document data interface includes a character user interface.

12. The system of claim 7, wherein said at least one of said first data and said second data includes metadata.

13. The system of claim 7, wherein said computer database management system is an object oriented computer databases management system.

14. The system of claim 7, wherein said document data interface is further configured to support deriving third data from a file that includes the document or assigning fourth data to said file, said computer database management system is further configured to organize at least one of said third data and said fourth data as second attributes of said parent object of said first computer database, and said memory of said computer processor system is further configured to store said at least one of said third data and said fourth data.

15. A computer program product for managing data associated with a document stored in an electronic form, said computer program product having computer program code means embodied in computer-readable medium wherein said computer program product runs on a computer processor system having memory and an output device, said computer program code means comprising:
   a first program code means for at least one of deriving first data from the document and assigning second data to the document with at least one of a computer processed algorithm and a user-operated computer graphics tool, wherein the first data is other than data intentionally included in the document for a purpose of conveying information about at least one of the document and an object associated with the document;

a second program code means for organizing at least one of said first data and said second data as first attributes of a parent object of a first computer database stored in said memory of said computer processor system;

a third program code means for organizing at least one attribute of said first attributes as a child object of said parent object, wherein said at least one attribute is associated with a feature of the document;

a fourth program code means for moving an attribute of said first attributes from said parent object of said first computer database to an object of a second computer database stored in said memory of said computer processor system; and a fifth program code means for adding, as a new attribute of said parent object of said first computer database, an address of a location in said memory of said computer processor system at which said object of said second computer database is stored;

wherein the first computer database is configured so that a result of a query of the child object of the first computer database is produced on an output device at a higher rate than a result of a query of the parent object of the first computer database.

16. The computer program product of claim 15, wherein said at least one of said first data and said second data includes metadata.

17. The computer program product of claim 15, wherein the document is an image, said image was captured with an electronic imaging device, and said at least one of said first data and said second data includes a time at which said image was captured.

18. The computer program product of claim 15, wherein the document is an image and one of said image and a reproduction of said image is included as an attribute of said first attributes.

19. The computer program product of claim 15, wherein the document is a part of a file and an address of a location in a memory of said computer processor system at which said file is stored is included as an attribute of said first attributes.

20. The computer program product of claim 15, wherein the document is a part of a file and said computer program code means further comprises:

a sixth program code means for deriving third data from said file or assigning fourth data to said file with at least one of said computer processed algorithm and said user operated computer graphics tool; and a seventh program code means for organizing at least one of said third data and said fourth data as second attributes of said parent object of said first computer database.

* * * * *